United States Patent [19]

Serizawa

[11] Patent Number: 4,918,746
[45] Date of Patent: Apr. 17, 1990

[54] COMMUNICATION SYSTEM WITH MOBILE STATIONS

[75] Inventor: Mutsumi Serizawa, Tokyo, Japan

[73] Assignee: Kabushiki Kaisha Toshiba, Kawasaki, Japan

[21] Appl. No.: 162,819

[22] Filed: Mar. 1, 1988

[30] Foreign Application Priority Data

May 15, 1987 [JP] Japan .............................. 62-116929

[51] Int. Cl.⁴ ............................................. H04B 1/38
[52] U.S. Cl. ........................................ 455/54; 370/32; 379/57
[58] Field of Search ...................... 455/54, 53, 52, 57, 455/33, 17, 18; 340/825.44, 825.5; 379/57, 59, 60

[56] References Cited

U.S. PATENT DOCUMENTS

| | | | |
|---|---|---|---|
| 4,096,440 | 4/1977 | Okasaka | 379/59 |
| 4,144,412 | 1/1977 | Ito | 455/33 |
| 4,490,818 | 12/1984 | Otsuka | 455/18 |
| 4,525,861 | 8/1984 | Freeburg | 455/33 |
| 4,597,105 | 10/1981 | Freeburg | 455/33 |
| 4,608,711 | 6/1984 | Goldman | 379/59 |
| 4,619,002 | 7/1984 | Thro | 455/33 |
| 4,644,351 | 5/1984 | Zabarsky et al. | 455/33 |
| 4,696,051 | 12/1985 | Breeden | 455/33 |

Primary Examiner—Benedict V. Safourek
Assistant Examiner—Tesfaldet Bocure
Attorney, Agent, or Firm—Foley & Lardner, Schwartz, Jeffery, Schwaab, Mack, Blumenthal & Evans

[57] ABSTRACT

A communication system including at least one mobile station. The system comprises a transmission line, a control station connected to the transmission line, the mobile station and a plurality of base stations connected to the transmission line. Each of the base stations includes a delaying device. Each of the base stations receives a first signal from the control station through the transmission line, transmits a second signal based on the first signal to the mobile station by radio, receives a third signal transmitted from the mobile station by radio, generates a fourth signal based on the third signal, delays the fourth signal by using the delaying device, and transmits the delayed fourth signal to the control station through the transmission line. The delaying device delays the fourth signal such that, when a plural number of the base stations simultaneously receive the third signal, the plural number of the base stations transmit the fourth signals with time delay to the control station through the transmission line.

2 Claims, 8 Drawing Sheets

MOBILE STATION RELATIVE TRANSMITTING POWER (dB)

COMMUNICATION SYSTEM WITH MOBILE STATIONS

BACKGROUND OF THE INVENTION

1. Field of the Invention

The present invention relates to a communication system for communicating with mobile stations with radio signals, and particularly to a communication system which can prevent signals from colliding with each other between a paging control station of the system and base stations thereof to improve a signal traffic efficiency of the system.

2. Description of the Prior Art

A communication systems for communicating with mobil objects with radio signals is recently studied as a new radio communication system. For instance, a message communication system or an interoffice paging system is studied to transmit message data by using radio waves to mobile objects within particular areas of the office.

In such a communication system, a small area method or a minute area method is adopted to effectively use frequencies of radio waves and to cope with a weak electric field (weak power) of the radio wave.

Figure 1:
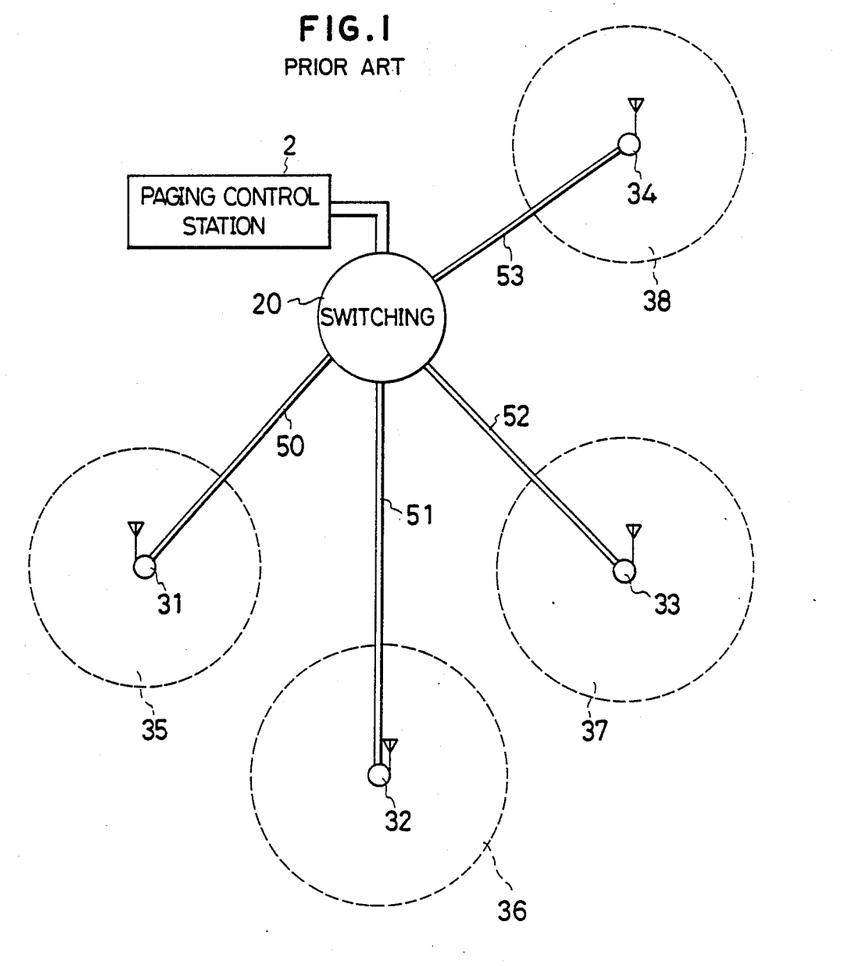
FIG. 1 is a block diagram schematically showing the constitution of a communication system with mobile stations according to a prior art.

FIG. 1 is a block diagram showing a conventional communication system for communicating with a mobile object. In the figure, base stations 31, 32, 33 and 34 are provided with small communication areas 35, 36, 37 and 38 respectively. The base stations are connected to a switching 20 with lines 50, 51, 52 and 53 respectively. Signals from a paging control station 2 are transmitted to the base stations 31, 32, 33 and 34 via the switching 20 and the corresponding lines.

This arrangement may be used to call a certain person. In this case, it is not clear in which area the person exists. Therefore, paging signals for calling the person shall be transmitted to all the base stations 31, 32, 33 and 34, and, to achieve this, the base stations shall have their respective lines 50, 51, 52 and 53 extending to the switching 20. This conventional system has, therefore, a drawback that, every time when an extension base station is added to the system, a new line shall be provided between the extension base station and the switching 20.

SUMMARY OF THE INVENTION

An object of the present invention is to provide a communication system with mobile stations, which requires no additional lines even if extension base stations are added to the system.

Another object of the present invention is to provide a communication system with mobile stations, which can prevent signals from colliding with each other between base stations of the system and a paging control station thereof to improve a signal traffic efficiency of the system.

In order to accomplish the objects and advantages mentioned in the above, the present invention provides a communication system with mobile stations, which comprises (a) a transmission line for transmitting information signals; (b) a control station connected to the transmission line to transmit and receive information signals to and from the transmission line; (c) at least one mobile station; (d) a plurality of base stations for transmitting radio signals to the mobile station according to the information signals supplied from the control station through the transmission line, receiving a radio signal from the mobile station, and transmitting signals based on the received signal to the control station through the transmission line.

Each of the base stations is provided with a delaying device so that, when a plural number of the base stations simultaneously receive the signal from the mobile station, the base stations which have received the signal transmit signals based on the received signal to the transmission line with time intervals. The delaying device delays the received signal by a delay time which is decreased in accordance with an increase of an electric field strength of the received signal and transmits the delayed signal.

BRIEF DESCRIPTION OF THE DRAWINGS

These and other objects, features and advantages of the present invention will become apparent from the following descriptions of preferred embodiments taken in conjunction with the accompanying drawings in which.

DETAILED DESCRIPTION OF THE PREFERRED EMBODIMENTS

Figure 2:
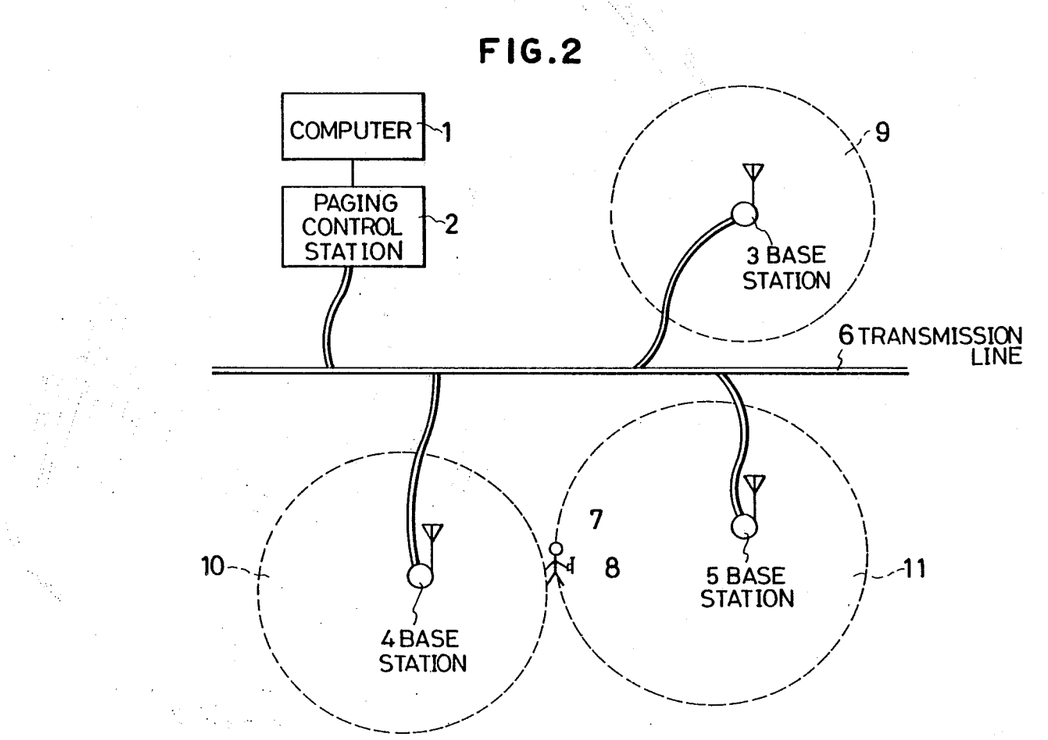
FIG. 2 is a block diagram schematically showing the constitution of a communication system with mobile stations according to a first embodiment of the present invention.

FIG. 2 schematically shows the constitution of a communication system with mobile stations according to the first embodiment of the present invention.

The communication system utilizes a LAN (Local Area Network) transmission line 6 to which base stations 3, 4 and 5 are connected. Communication areas 9, 10 and 11 are set around the base stations 3, 4 and 5 respectively. A paging control station 2 is also connected to the LAN transmission line 6. A. call signal from the paging control station 2 is supplied to the respective base stations through the single LAN transmission line 6. Therefore, not like the prior art system shown in FIG. 1, the system shown in FIG. 2 requires no additional lines even if extension base stations are added to the system. The paging control station 2 is connected to a computer 1.

When the call signal is received by a mobile station 8, the mobile station 8 sends an acknowledge signal (ACK) to the base stations.

Generally, power of the acknowledge signal transmitted from the mobile station 8 is weak. To receive this weak signal, the small areas 9, 10 and 11 are defined around the base stations 3, 4 and 5 respectively.

When the mobile station 8 possessed by a called person is in the vicinity of one of the small areas, the acknowledge signal is received by one base station in the one small area. However, if the called person is in the vicinity of a plural number of the small areas, the acknowledge signal is simultaneously received by plural base stations in these small areas, and, if these base stations simultaneously transmit signals based on the received acknowledge signal to the paging control station 2 through the LAN transmission line 6, the signals may collide with each other because the single transmission line 6 is commonly used by the base stations.

Namely, if the plural base stations simultaneously send the signals based on the received acknowledge signal, the signals may collide with each other to cause a traffic congestion to increase a transmission time.

To cope with this problem, according to the communication system of the present invention, the plural base stations which have simultaneously received the acknowledge signal from the mobile station 8 transmit, with time intervals, signals based on the acknowledge signal to the paging control station 2 through the LAN transmission line 6.

Figure 3:
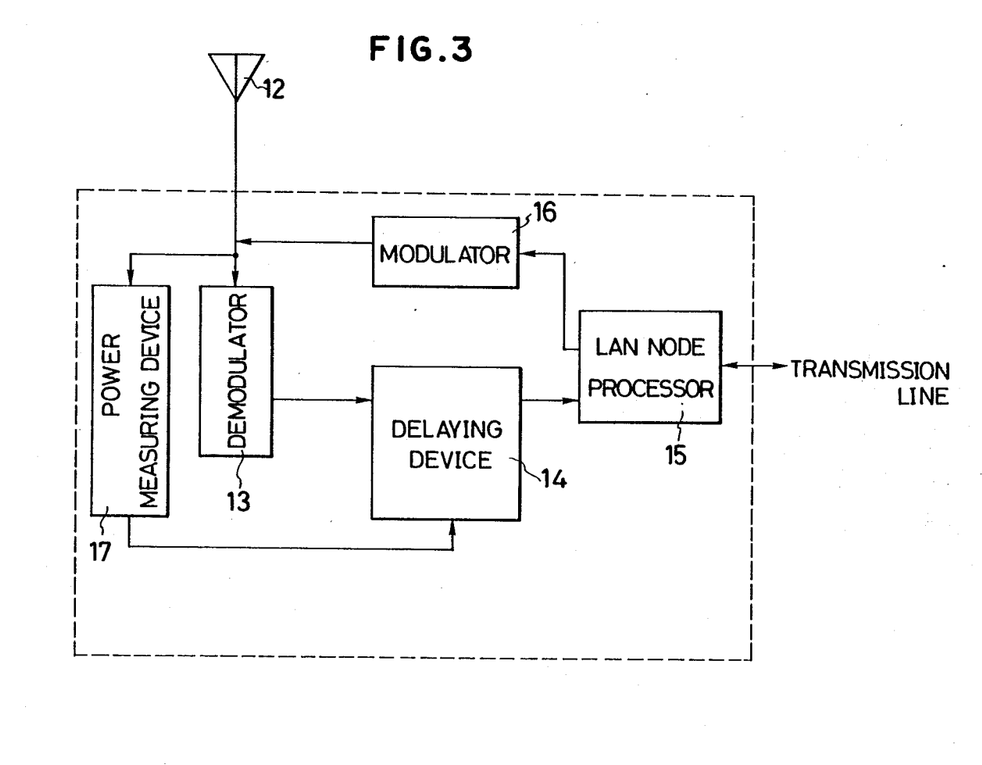
FIG. 3 is a block diagram showing the constitution of a base station of the first embodiment shown in FIG. 2.

To achieve such transmission of the acknowledge signal with time intervals to the paging control station 2, each of the base stations 3, 4 and 5 of the present invention comprises, as shown in FIG. 3, an antenna 12 for transmitting and receiving signals such as the acknowledge signal to and from the mobile station 8, a demodulator 13 for demodulating the acknowledge signal transmitted from the mobile station 8 and received by the antenna 12, a power measuring device 17 for measuring an electric field strength of the acknowledge signal received by the antenna 12, and a delaying device 14 for delaying the acknowledge signal from the demodulator 13 by a delay time which is decreased in accordance with an increase of the electric field strength of the received acknowledge signal measured by the power measuring device 17.

Each base station further comprises a LAN node processor 15 for supplying the delayed acknowledge signal from the delaying device 14 to the transmission line 6 and receiving signals from the transmission line 6, and a modulator 16 for modulating the signals supplied from the transmission line 6 through the LAN node processor 15 and supplying the modulated signals to the antenna 12.

Since the electric field strength of an acknowledge signal received by the antenna 12 is substantially in proportion to a K power of a distance between the base station in question and the mobile station 8, the larger the strength of the acknowledge signal, the shorter the distance between the base station in question and the mobile station 8 (K= −2 to −4). Therefore, a delay time set by the delaying device 14 becomes shorter as the electric field strength of a received signal becomes larger.

As a result, even if a plural number of the base stations simultaneously receive the acknowledge signal from the mobile station 8, signals based on the acknowledge signal are transmitted from these base stations with time intervals so as to prevent the signals from colliding with each other in the transmission line 6.

In addition, a signal of the base station which has received the acknowledge signal with the strongest strength is firstly supplied to the paging control station 2 so that the paging control station 2 can distinguish signals from the base stations one from another clearly and quickly.

In this embodiment, relations of a delay time and an electric field strength in the delaying device 14 are set as shown in Table 1.

When a CSMA LAN method is adopted, a delay time will be less than that shown in Table 1 because the CSMA method does not allow a signal to be transmitted through a transmission line while the transmission line is being occupied by other signals Namely, if a base station which received a signal with large electric field strength has already sent a signal based on the received signal, the CSMA method does not allow other stations of longer delay times to send their signals. Therefore, the CSMA method, if adopted, can reduce an average transmission delay time.

TABLE 1

| Received strength (dBm) | Delay time (μsec) |
| --- | --- |
| −140−−137 | 700 |
| −136.9−−134 | 600 |
| −135.9−−131 | 500 |
| −130.9−−128 | 400 |
| −127.9−−125 | 300 |
| −124.9−−122 | 200 |
| −121.9−−119 | 100 |
| −118.9− | 0 |

Transmission speed in transmission line = 10 Mbsp
One message = 100 bytes

An operation of the communication system with mobile stations of the first embodiment will be described.

An ID number of the mobile station 8 which may be a pocket bell or a message communication device possessed by a person 7 to be called is inputted into the computer 1 through a keyboard thereof. A signal comprising, for instance, 0s and 1s representing the ID number from the computer 1 is inputted into the paging control station 2 which modulates the signal and transmits the same to the transmission line 6.

The transmission line 6 may be of a CSMA/CD LAN method in which, when a signal common to a plurality of equipments and terminals is passing through the transmission line, other signals are not allowed to pass through the transmission line. Therefore, if a plurality of signals are simultaneously transmitted to the transmission line, they may collide with each other.

Meanwhile, the signal transmitted to the transmission line 6 is inputted into the base stations 3, 4 and 5 having the communication areas 9, 10 and 11 respectively. Each of the communication areas 9, 10 and 11 has a predetermined communication area of, for instance, 10 meters in radius.

In each base station, the signal is inputted into the LAN node processor 15, modulated by the modulator 16 to a high frequency signal and transmitted from the antenna 12. Namely, the high frequency signals are transmitted from the base stations 3, 4 and 5.

It is supposed that the person 7 is in the vicinity of communication areas 10 and 11 around the base stations 4 and 5. The high frequency signals from the base stations 3, 4 and 5 are received by the mobile station 8 possessed by the called person 7. After acknowledge the call, the person 7 operates a switch of the mobile station 8 to cause an acknowledge signal generating portion in the mobile station 8 to generate an acknowledge signal. The acknowledge signal is transmitted as a radio signal from the mobile station 8.

Since the mobile station 8 shall be compact, its transmission power is not so large so that its communication distance is, for instance, 10 meters in every direction. Therefore, the acknowledge signal from the mobile station 8 is simultaneously received by the base stations 4 and 5 because the called person 7 is in the vicinity of the communication areas of the base stations 4 and 5.

In each of the base stations 4 and 5, the acknowledge signal is received by the antenna 12 and converted by the. demodulator 13 into a base band signal which is inputted into the delaying device 14. The delaying device 14 also receives an electric field strength of the received signal measured by the power measuring device 17, delays the acknowledge signal based on the electric field strength, and transmits the delayed signal to the transmission line 6.

Supposing an electric field strength of the acknowledge signal received by the base station 4 is −125 dBm and that of the signal received by the base station 5 being −131 dBm, the delaying device 14 of the base station 4 delays the acknowledge signal by 300 μsec to transmit the same via its LAN node processor 15 to the transmission line 6, while the delaying device 14 of the base station 5 delays the acknowledge signal by 500 μsec to transmit the same via its LAN node processor 15 to the transmission line 6. In this way, the signals based on the acknowledge signal are transmitted from the base stations 4 and 5 with time intervals.

The signal from the base station 4 is firstly inputted into the paging control station 2, converted into a signal comprising 0s and 1s, and inputted into the computer 1 to confirm that the called person 7 has acknowledge the call.

With the arrangement mentioned in the above, the signals based on the acknowledge signal are not transmitted to the transmission line simultaneously to prevent them from colliding with each other, quicken an identification time thereof and shorten a loss time.

Figure 4:
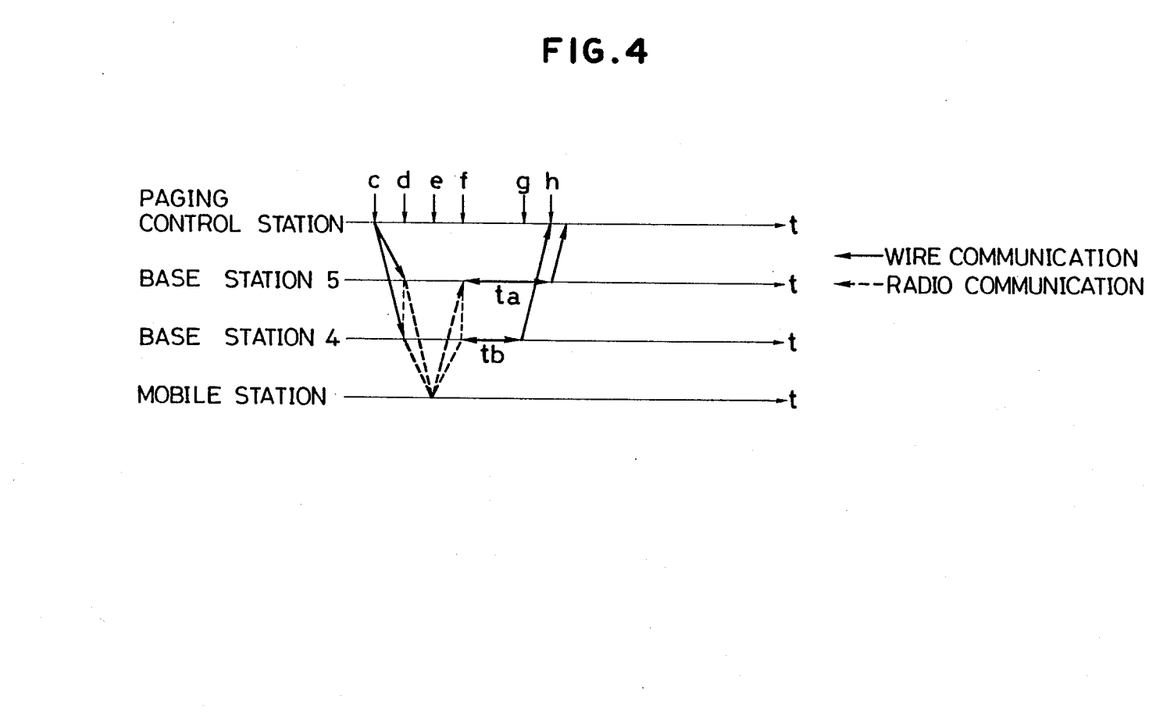
FIG. 4 is a time chart showing an operation of the first embodiment shown in FIG. 2.

FIG. 4 is a time chart showing the above-mentioned operation of the first embodiment. At a time "c", the call signal is transmitted from the paging control station 2. At a time "d", the base stations 4 and 5 simultaneously call the mobile station 8 with radio signals. At a time "e", the mobile station 8 acknowledge the call and transmits the acknowledge signal to the base stations 4 and 5. The acknowledge signal is received by the base stations 4 and 5 at a time "f". The base station 5 delays the signal by 500 μsec and transmits the delayed signal at a time "h" to the paging control station 2 via the transmission line 6, while the base station 4 delays the signal by 300 μsec and transmit the delayed signal at a time "g" to the paging control station 2.

Figure 5:
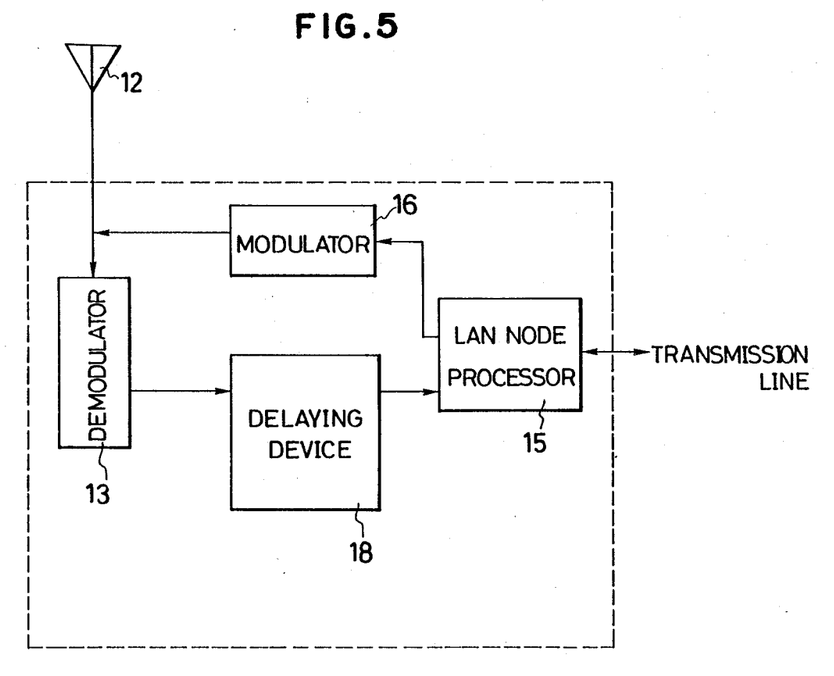
FIG. 5 is a block diagram showing the constitution of a base station of a communication system with mobile stations according to a second embodiment of the present invention.

A communication system with mobile stations according to the second embodiment of the present invention will be described with reference to FIG. 5.

In the system of the second embodiment, each delaying device 18 of each base station is constituted to have a particular delay time. The delaying device 18 contains a random time generating portion to generate a time set for each of the base stations 3, 4 and 5. Each delaying device 18 delays an acknowledge signal converted into a base-band signal by the random time and transmits the delayed signal to the transmission line 6. For instance, the random time will be 0.1 ms for the station 3, 0.3 ms for the station 4 and 0.5 ms for the station 5. Therefore, in the base station 4., an acknowledge signal is converted into a base band signal, delayed by 0.3 ms in the delaying device 18, transferred to the LAN node processor 15, and transmitted to the transmission line 6. On the other hand, in the base station 5, the acknowledge signal is converted into a base band signal, delayed by 0.5 ms in its delaying device 18, transferred to its LAN node processor 15, and transmitted to the transmission line 6. Other constitution of the second embodiment is the same as that of the first embodiment so that a detailed explanation thereof will be omitted.

Figure 6:
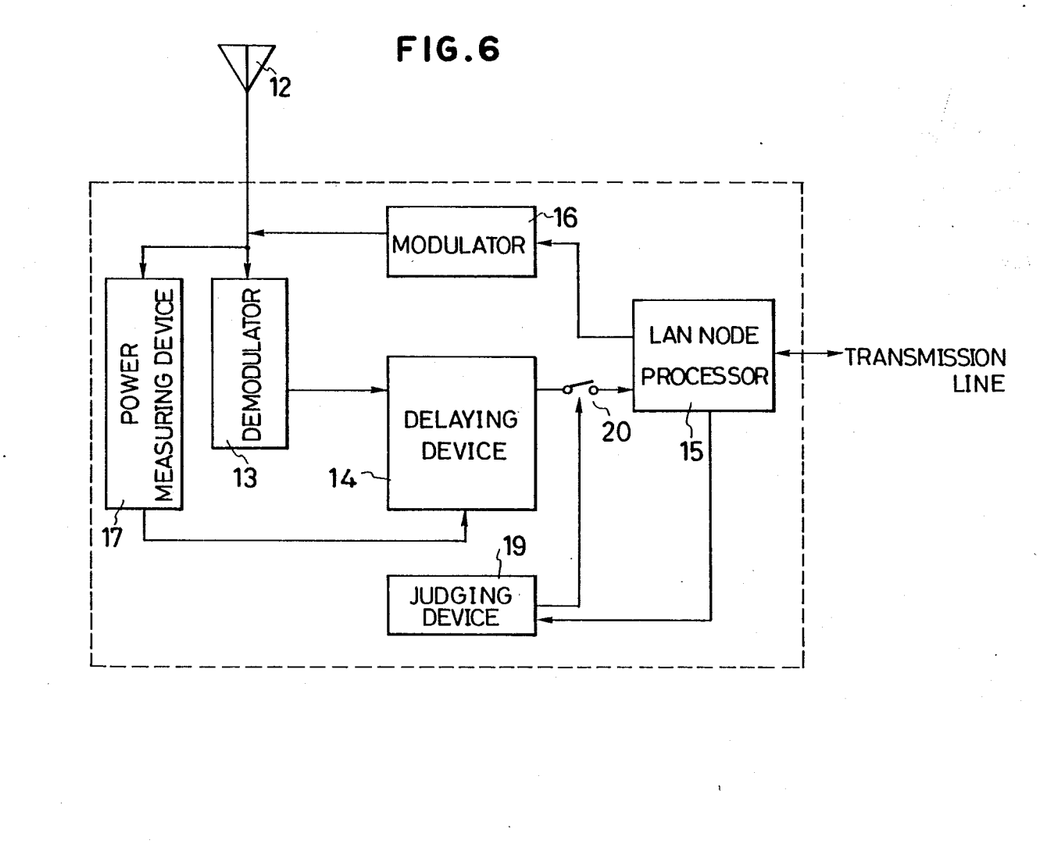
FIG. 6 is a block diagram showing the constitution of a base station of a communication system with mobile stations according to a third embodiment of the present invention.

A communication system with mobile stations according to the third embodiment of the present invention will be described with reference to FIG. 6.

Each base station of the third embodiment comprises, in addition to the components of the base station of the first embodiment, a judging device 19 for judging whether or not the same acknowledge signal has already been transmitted to the transmission line 6 from other base stations, and an isolating switch 20 for blocking a signal of the delaying device 14 from being transmitted when the judging device 19 judges that the same acknowledge signal has already been transmitted from another base station.

Further, in the above embodiments, if the computers intend to communicate information with each other through the transmission line, such a communication between the computers is given priority.

Therefore, according to the third embodiment, if the same data as those received by the base station in question already exist on the transmission line, the base station in question does not transmit the data to the transmission line.

An additional advantage will be realized by combining the third embodiment with the first embodiment. While a delay time of a base station whose received electric field is strong being controlled small, the third embodiment allows only a base station which has received a signal with the strongest electric field to send a signal based on the received signal to a paging control station and does not allow other base stations to send signals to the paging control station. As a result, an effect that will be obtainable by a diversity method between a plurality of base stations can be achieved by the above-mentioned combination to remarkably reduce a transmission error rate.

Average error rates have been simulated with a LAN transmission line of the CSMA/CD method for a system 1 in which respective base stations which have received an acknowledge signal from a mobile station send data to the LAN transmission line with random delay times irrespective of their received electric field strengths, and a system 2 in which base stations send their data with delay times which are in inverse proportion to their received electric field strengths. The acknowledge signal includes an address indicating a paging control station and a code indicating the mobile station.

Figure 8:
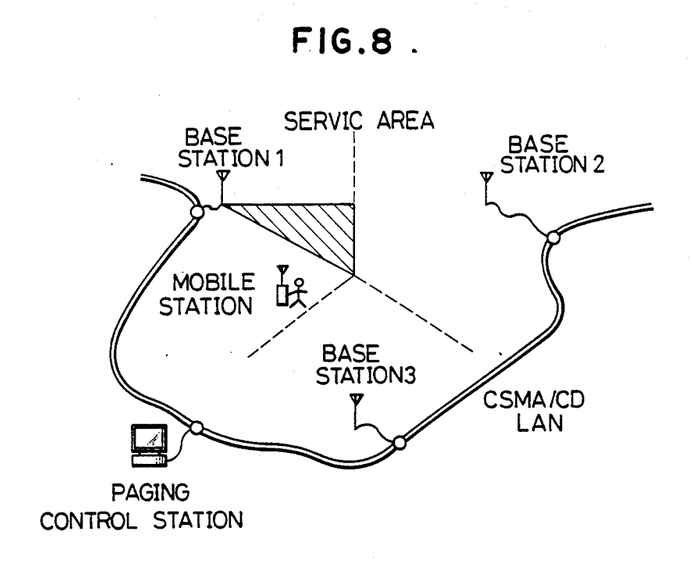
FIG. 8 is a block diagram schematically showing the constitution of a communication system according to another embodiments.

The simulation has been conducted with the conditions of (a) a successful packet reception being judged if a header is received by the base stations without error, (b) the LAN transmission line of no error rate, (c) reception power in Rayleigh distribution and of distance's fourth power law attenuation, (d) BpSK synchronous detection, (e) no collision in radio transmission lines, and (f) the base stations located at vertexes of equilateral triangles and the mobile station having a chance of equally distributed in a hatched area shown in FIG. 8.

Figure 9:
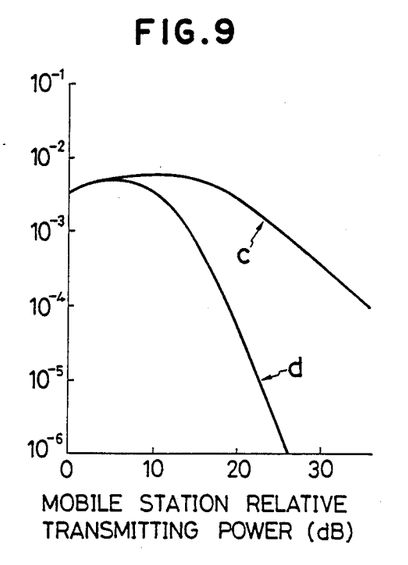
FIG. 9 is a view showing relations between transmission power of the mobile station and average error rates of data portions.

FIG. 9 is a view showing relations between relative transmission power of the mobile station and average error rates of data portions of packets whose 64-bit headers have been received without error. Due to the diversity effect, the system 2 can reduce the transmission power of the mobile station by 17 dB compared to the system 1 to obtain an average error rate of $10^{-4}$.

Figure 7:
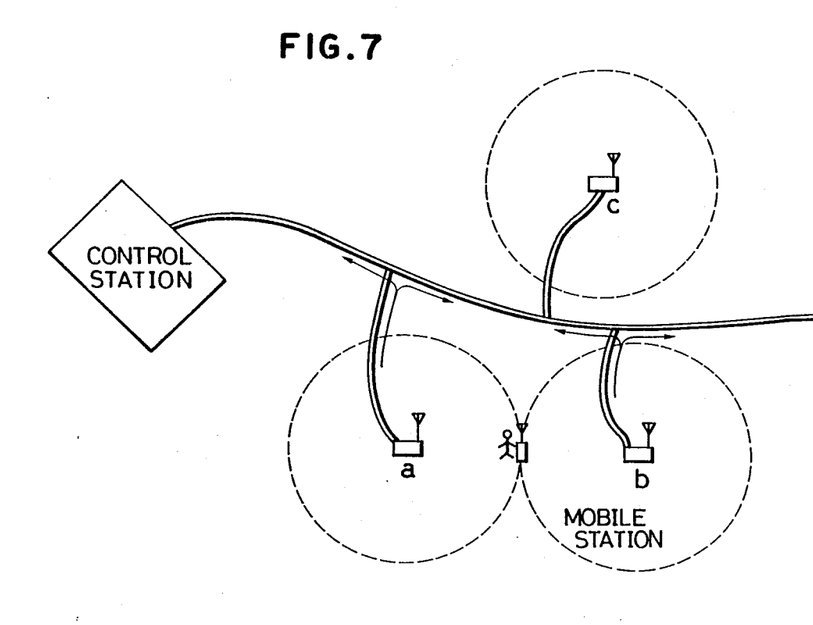
FIG. 7 is a view showing the flow of signals when a mobile station is at a position substantially equally distanced from two base stations.

As shown in FIG. 7, if the mobile station is located at a position which is equally distanced from two base stations "a" and "b", an acknowledge signal received by the two base stations will indicate the same power in the two base stations. In this case, signals transmitted from the two stations collide with each other so as not to reach the control station. However, with the arrangement of the third embodiment, such a collision will not occur.

Although the transmission line in the embodiments has been a cable, wireless communications may be realized with an antenna being provided for the paging control station.

The present invention is applicable not only to private pagers but also to other mobile communication systems. For instance, the present invention is applicable to communications between a mobile (portable) terminal and a host computer.

In summary, if a mobile station is located at a place where communication areas of a plurality of base stations overlap one upon another or where boundaries of a plurality of base stations meet with each other, a signal from the mobile station reaches the plurality of base stations at the same time. Even so, the base stations according to the present invention transmit the signals with time intervals so that the signals will not collide with each other. Therefore, the signals need not be sent repeatedly to shorten a transmission time.

Various modifications will become possible for those skilled in the art after receiving the teachings of the present disclosure without departing from the scope thereof.

What is claimed is:

1. A communication system, comprising:
 (a) a transmission line for transferring an information signal;
 (b) a control station connected to said transmission line;
 (c) at least one mobile station for receiving a first information signal by radio to transmit a second information signal by radio; and
 (d) a plurality of base stations connected to said transmission line, each of said base stations including a delaying means, and
 (e) first receiving means for receiving the first information signal from said control station through the transmission line to transmit the first information signal to said mobile station by radio, and second receiving means for receiving the second information signal transmitted from said mobile station by radio to transmit the second information signal to said control station via said transmission line,
 said delaying means being constructed for delaying the second information signal from said base station such that, when a plural number of said base stations simultaneously receive the second information signal from said mobile station, said plural number of said base stations transmit the second information signals with time delay to said control station through said transmission line,
 said delaying means also being constructed for delaying the second information signal by a delay time which is decreased in accordance with an increase of a received electric field strength of the second information signal from said mobile station.

2. A communication system, comprising:
 (a) a transmission line for transferring an information signal;
 (b) a control station connected to said transmission line;
 (c) at least one mobile station for receiving a first information signal by radio to transmit a second information signal by radio; and
 (d) a plurality of base stations connected to said transmission line, each of said base stations including a delaying means, and
 (e) first receiving means for receiving the first information signal from said control station through the transmission line to transmit the first information signal to said mobile station by radio, and second receiving means for receiving the second information signal transmitted from said mobile station by radio to transmit the second information signal to said control station via said transmission line,
 said delaying means being constructed for delaying the second information signal from said base station such that, when a plural number of said base stations simultaneously receive the second information signal from said mobile station, said plural number of said base stations transmit the second information signals with time delay to said control station through said transmission line, wherein,
 each of said base stations includes an isolating means for blocking the delayed second information signal from being transmitted to said transmission line when the same delayed second information signal has already been transmitted to said transmission line from the other of said base stations.

* * * * *